Sept. 28, 1943. L. W. REAUME 2,330,448
PACKAGING MEANS FOR SHIPPING ARTICLES IN CONTAINERS
Filed May 6, 1940 2 Sheets-Sheet 1

INVENTOR.
LAWRENCE W. REAUME
BY Whittemore Hulbert & Belknap
ATTORNEYS

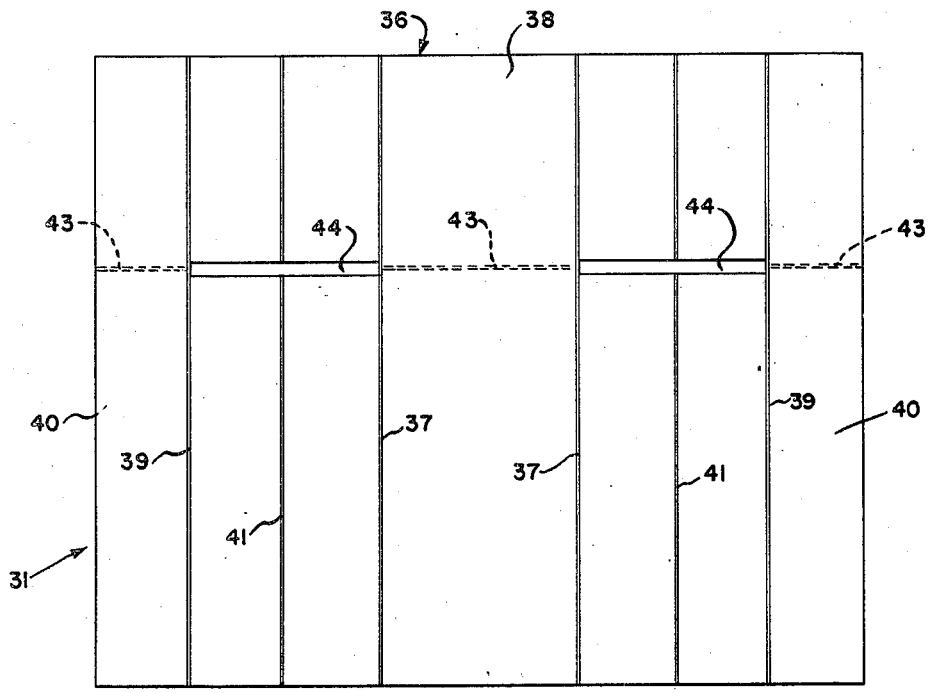
FIG. 6.
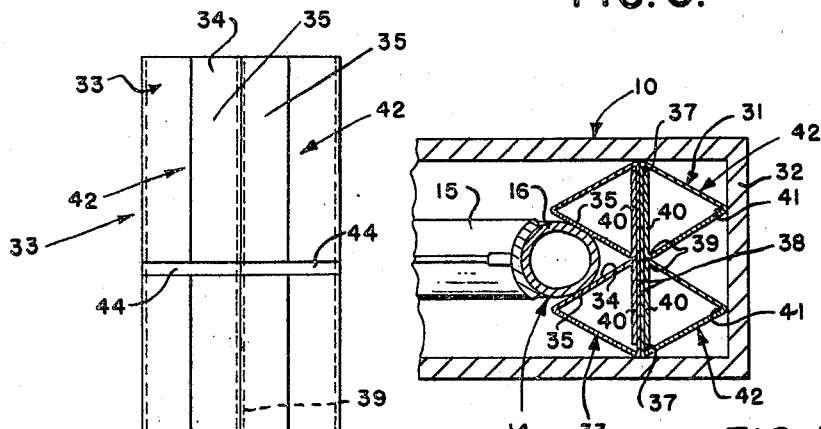
FIG. 5.
FIG. 7.

Patented Sept. 28, 1943

2,330,448

UNITED STATES PATENT OFFICE 2,330,448

PACKAGING MEANS FOR SHIPPING ARTICLES IN CONTAINERS

Lawrence W. Reaume, Monroe, Mich., assignor to River Raisin Paper Company, Monroe, Mich., a corporation of Michigan Application May 6, 1940, Serial No. 333,662

12 Claims. (Cl. 206—46)

This invention relates generally to packages for use in transporting or shipping articles and contemplates improved bracing means for retaining the articles in position in shipping containers. This application is a continuation in part of my copending application, Serial No. 325,422, filed March 22, 1940.

The invention concerns itself more particularly with shipping wheeled vehicles, such as bicycles, in containers, and has as one of its objects to provide packing means for shipping a bicycle in a container against shifting movement relative to the container.

In shipping bicycles, it is customary to pack the same in a container with the wheels assembled on the frame and with the pneumatic tires in position on the rims of the wheels. Pneumatic tires are usually inflated prior to packing the bicycle in the container and some means is ordinarily provided for holding the bicycle against movement relative to the container. The holding means heretofore employed usually embodied some type of a brace insertable in the shipping container in a manner to engage the pneumatic tires on the wheels of the bicycle and no provision was made to compensate for loss in pressure in the tires during shipment or transportation. Accordingly, any pressure loss in the tires produced a clearance between the tires and their respective bracing means and the bicycle would have a tendency to shift in the container during transportation. Such shifting movement of the bicycle is, of course, objectionable because it causes the tires to rub against the adjacent bracing means or packing and produce worn spots on the tires.

It is, therefore, another object of this invention to provide packing means engageable with one wheel of the bicycle and effective to take up any clearance resulting from a drop in pressure in the pneumatic tires of the bicycle. As a result, the bicycle is effectively supported in the container against movement relative to the container during transportation and rubbing of the tires against any part of the packing is thereby eliminated.

A still further object of this invention resides in the provision of packing means which is not only inexpensive to produce, but is also capable of being readily assembled in the container. This object, as well as the foregoing and other features of the invention, will be made more apparent as the description proceeds, especially when considered in connection with the accompanying drawings, wherein:

Figure 5 is an enlarged sectional view taken substantially on the plane indicated by the line 5—5 of Figure 1;

Figure 6 is a plan view of the sheet of material from which the backing means for the rear end of the bicycle is formed;

Figure 7 is an elevational view illustrating the sheet shown in Figure 6 after the latter has been bent to form the spacer at the rear end of the bicycle;

Figure 1:
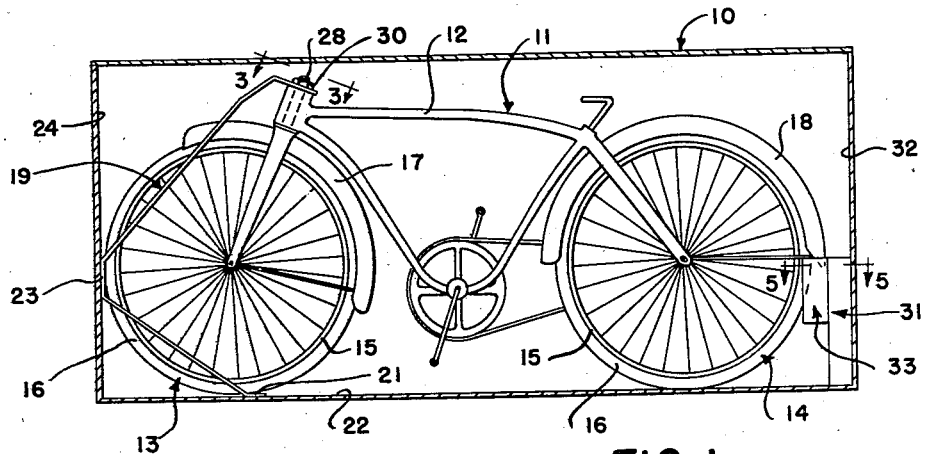
Figure 1 is a semi-diagrammatic longitudinal sectional view through a container showing a bicycle supported in the container by packaging means constructed in accordance with this invention.

Referring now more in detail to the drawings, it will be noted that the reference character 10 designates a shipping container formed of an inexpensive, bendable material, such as paper board, and being of sufficient size to adequately enclose a bicycle subassembly 11. Briefly described, the bicycle subassembly shown is of conventional design having a frame 12 and having front and rear wheels 13 and 14, respectively. The wheels are mounted on the frame in accordance with orthodox practice and each wheel has a rim 15 and a pneumatic tire 16 suitably mounted on the rim. In addition, the bicycle subassembly has a mud guard 17 secured in any suitable manner to the forward end of the frame 12 in proper relationship to the front wheel 13 and has a rear mud guard 18 suitably mounted on the rear portion of the frame in proper relationship to the rear wheel 14.

Figure 4:
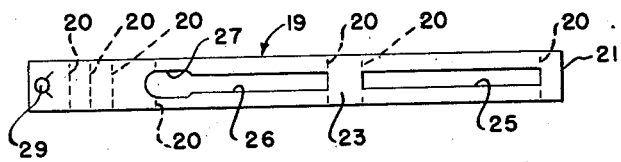
Figure 4 is a plan view of the packing brace employed in connection with the forward end of the bicycle.

As stated above, it is important to support the bicycle subassembly 11 in the shipping container 10 in such a manner that the bicycle is prevented from movement relative to the shipping container during transportation. In the present instance, the forward end of the bicycle is supported by a packing device or brace 19 formed of any suitable, bendable material and, in the interest of economy, is shown herein as fashioned from a strip of corrugated paper board. Upon reference to Figure 4, it will be noted that the device or strip 19 is scored or provided with fold lines 20 at predeterminedly spaced points throughout its length to permit the strip to be bent to the contour shown in Figure 1 of the drawings. When the strip is bent to the contour shown in Figure 1, the lower edge 21 rests on the bottom wall 22 of the container and a portion 23 is provided intermediate the ends for flat engagement with the end wall 24 of the shipping container.

Figure 2:
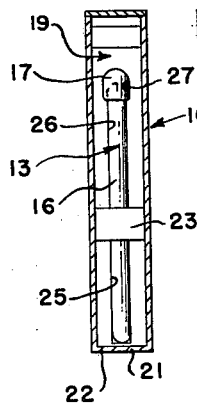
Figure 2 is an end elevational view of the container with certain parts broken away for the make of clearness.
Figure 3:
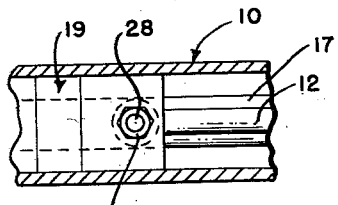
Figure 3 is a sectional view taken substantially on the plane 3—3 of Figure 1.
Figure 8:
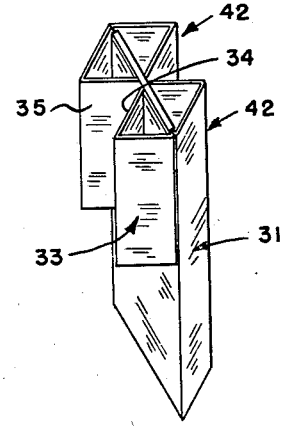
Figure 8 is a perspective view of the spacer shown in Figure 1.

The portions of the strip at opposite ends of the bearing portion 23 are formed with elongated openings or slots 25 and 26 therethrough. The slots are of sufficient width to receive the tire and rim portions of the front wheel which occupy positions on opposite sides of the bearing portion 23 of the strip. As shown particularly in Figure 2, the slot 25 is adapted to receive the lower front portion of the wheel 13 and the slot 26 is adapted to receive the upper front portion of the wheel 13. In this connection, it will be noted that the slot 26 is provided with an enlargement 27 at the upper end for receiving the front end of the front mud guard 17.

The wheel receiving slots in the strip 19, of course, hold the front end of the bicycle centered in the shipping container in spaced relation to the opposite side walls of the latter and the width of the strip approximates the width of the shipping container so that lateral shifting movement of the forward end of the bicycle relative to the container is prevented. It will also be noted that the lower edge 21 of the strip and the bearing portion 23 serve to hold the tire on the front wheel of the bicycle in spaced relation to the adjacent surfaces of the shipping container.

Owing to the scored portions 20 at the upper end of the strip 19, the latter end of the strip may be bent at right angles to the axis of the steering post 28 of the bicycle. The steering post 28 is swivelly supported in the forward portion of the bicycle frame 11 in accordance with conventional practice and the upper end of the strip 19 is formed with an opening 29 therethrough for receiving the projecting end of the post. The upper end of the steering post is threaded for receiving a clamping nut 30 which is ordinarily used for securing the handle bars of the bicycle on the post. However, the handle bars are omitted from the subassembly during shipment and the nut 30 functions to clamp the upper end of the strip 19 to the bicycle. With this arrangement, the strip 19 may be assembled with the bicycle prior to inserting the latter in the container and this is desirable in that it expedites packing the bicycle for shipment.

The rear end of the bicycle is supported in the shipping container by means of a spacer 31 positioned between the rear wall 32 of the shipping container and the rear wheel 14 on the bicycle. The spacer 31 has a portion 33 provided with a vertically extending recess or groove 34 having diverging opposite side walls 35. The recess 34 receives the adjacent portion of the rear pneumatic tire 16 and the diverging walls 35 having a wedging engagement with opposite sides of the tire in the manner clearly shown in Figure 5.

As a result of the foregoing, the spacer 31 holds the bicycle in the container with the front wheel 16 on the bicycle in abutting engagement with the bearing portion 23 on the strip 19 and, in turn, holds the bearing portion in flat engagement with the adjacent end wall 24 of the container. Owing to the wedging engagement of the diverging walls 35 with the rear tire 16, any clearance resulting from a drop in air pressure in either tire is automatically taken up and shifting movement of the bicycle relative to the container is prevented.

The spacer 31 is also formed from a sheet of inexpensive, bendable material, such as corrugated paper board. As shown in Figure 6, a sheet 36 of paper board of the proper size is selected and is scored or provided with fold lines 37 forming a central panel 38. Additional fold lines 39 are formed at opposite edges of the sheet to provide end panels 40. The portions of the sheet between the end panels 40 and the central panel 38 are also provided with fold lines 41 dividing each of the portions into two panels having approximately the same width as the end panels. The arrangement is such as to permit the end panels and the panels between the latter and central panel to be folded over the central panel in the manner clearly shown in Figure 7 to form projections 42 of triangular shaped cross section on opposite sides of the longitudinal center line of the central panel 38.

It will also be noted from Figure 6 that the central panel 38 and the end panels 40 are provided with aligned transversely extending fold lines 43 on the side of the sheet opposite the side on which the fold lines 37, 39 and 41 appear. The panels between the central panel 38 and end panels 40 are slit, as at 44, in alignment with the fold lines 43. As a result, when the sheet is bent to the shape shown in Figure 7, the portion above the slits 44 may be folded back upon the opposite side of the central panel 38 to form the portion 33 of the spacer 31. The adjacent sides of the triangularly shaped projections on the bent portion 33 form the diverging walls 35 previously described as engageable with opposite sides of the rear tire 16.

Thus, from the foregoing, it will be observed that I have provided a relatively simple, inexpensive spacer capable of being readily inserted in the container and having provision for imparting a wedging action against the bicycle to securely hold the same in the container. As stated above, this wedging action is desirable in that it insures holding the bicycle against movement in the container, even though a drop in pressure results in the pneumatic tires during shipment.

What I claim as my invention is:

1. A package for a bicycle having a frame and having a wheel mounted on the frame at one end of the latter, said package comprising a container adapted to receive the frame and wheel of the bicycle, and means for supporting the bicycle in the container including a spacer positioned in the container between one end wall of the container and the adjacent portion of the wheel, said spacer having resilient divergent opposed wall portions respectively engageable with opposite sides of the adjacent peripheral portion of the wheel to hold the wheel against lateral shifting movement in the container and coacting with each other and with the peripheral portion of the wheel to urge the bicycle toward the opposite end wall of the container.

2. A package for a bicycle having a frame carrying a wheel with a pneumatic tire thereon, said package comprising a container adapted to receive the frame and wheel, and a spacer positioned in the container beyond said wheel and having a portion spaced above the bottom of the container formed with a vertically extending recess for receiving a portion of the pneumatic tire on said wheel, said recess having diverging resilient side walls engageable with opposite sides of the pneumatic tire and coacting with said tire to urge the bicycle in a direction toward the opposite end wall of the container.

3. A package for a bicycle having a frame carrying a wheel with a pneumatic tire thereon, said package comprising a container adapted to receive the frame and wheel, a spacer comprising a sheet of bendable material folded to form laterally spaced hollow vertically extending projections having adjacent diverging walls, said spacer adapted to be positioned in the container beyond said wheel with the diverging walls engaging opposite sides of the pneumatic tire on said wheel and coacting with the pneumatic tire to urge the bicycle in a direction toward the opposite end wall.

4. A package for a bicycle having a frame carrying front and rear wheels having pneumatic tires, said package comprising a container adapted to receive the frame and wheels, a spacer comprising a sheet of bendable material folded to form laterally spaced hollow vertically extending projections triangular shaped in cross section and having one end portion bent back on the remaining portion, said spacer adapted to be positioned in the container at one end of the bicycle with the apexes of the triangular projections on said remaining portion abutting the adjacent end wall of the container and with the diverging walls of the projections on the folded portion engaging opposite sides of the pneumatic tire on the adjacent wheel of the bicycle.

5. A package for a bicycle having a frame carrying front and rear wheels having pneumatic tires, said package comprising a container adapted to receive the frame and wheels, a spacer comprising a sheet of bendable material folded to form a central portion having a width approximating the width of the container and to form two pairs of triangular shaped hollow projections at opposite sides of the central portion, said spacer adapted to be inserted in the container at one end of the bicycle with the apexes of one pair of projections engaging the adjacent end wall of the container and with the adjacent diverging walls of the other pair of projections engaging opposite sides of the pneumatic tire on the adjacent wheel.

6. A package for a bicycle having front and rear wheels carried by a frame, said package comprising a container adapted to receive the frame and wheels of the bicycle, means for supporting one end of the bicycle in the container including an elongated strip of bendable material having a width approximating the width of the container and having spaced slots therethrough for receiving portions of the perimeter of the wheel at the end aforesaid of the bicycle, said strip having one end engaging the bottom wall of the container and having an intermediate portion between the slots abutting the adjacent end wall of the container, and means for supporting the opposite end of the bicycle in the container including a spacer positioned in the container at the latter end of the bicycle and having a portion spaced above the bottom of the container, said portion of the spacer having opposed divergent resilient walls respectively engageable with opposite sides of the peripheral portion of the adjacent wheel on the bicycle to prevent lateral shifting movement of the latter wheel relative to the container and cooperating with each other and the peripheral portion of the wheel to apply a force on the bicycle tending to urge the latter in a direction to clamp the intermediate portion aforesaid of the strip against the adjacent end wall of the container.

7. A package for a bicycle having front and rear wheels carried by a frame, said package comprising a container adapted to receive the frame and wheels of the bicycle, means for supporting the forward end of the bicycle in the container including an elongated strip of bendable material having a width approximating the width of the container and having spaced slots therethrough for receiving portions of the perimeter of the front wheel of the bicycle, said strip having a portion between the slots abutting the front end wall of the container and having another portion engageable with the bottom wall of the container below the front wheel, and a spacer positioned in the container at the rear end of the bicycle and provided with diverging walls having a wedging engagement with opposite sides of the rear wheel of the bicycle tending to urge the bicycle in a direction to clamp the portion of the strip between the slots into abutting engagement with the front end wall of the container.

8. A package for a bicycle having a frame carrying front and rear wheels having pneumatic tires thereon, said package comprising a container adapted to receive the frame and wheels, means for supporting the front end of the bicycle in the container including an elongated strip of bendable material having one end attachable to a part of the bicycle above the wheel and having spaced slots therethrough for receiving portions of the perimeter of the wheel, said strip having a portion between the slots engageable with the front end wall of the container and having the lower end engaging the bottom wall of the container below the front wheel, and a spacer positioned in the container at the rear end of the bicycle and having a portion provided with diverging side walls arranged to have a wedging engagement with opposite sides of the pneumatic tire on the rear wheel and coacting with the last named pneumatic tire to urge the bicycle in a direction to clamp the portion of the strip between the slots into abutting engagement with the front end wall of the container.

9. A packing member for a bicycle comprising a sheet of bendable material having parallel longitudinally extending fold lines forming a central panel, opposite side panels and a pair of intermediate panels between said central panel and each of said side panels, said intermediate panels being transversely severed at a point in the length thereof, the said panels being foldable on said lines to form of said intermediate panels triangular projections with said side panels adjacent to said central panel, and said central panel and side panels being folded along the line of severance of said intermediate panels to arrange the triangular projections on opposite sides thereof.

10. A packing member for a bicycle comprising a sheet of bendable material having fold lines forming a central panel and forming end panels at opposite sides of the sheet, additional fold lines in the portion of the sheet between the opposite edges of the central panel and end panel dividing each of said portions into additional panels, said fold lines permitting the end panels and the panels between the latter and central panel to be folded over the central panel to form hollow triangular projections in overlapping relation with the central panel, said additional panels being slit transversely from opposite edges of the central panel to the adjacent edges of the end panels and the latter panels together with the central panel having a fold line in alignment with the slits, whereby one end portion of the folded sheet may be folded about the transverse fold lines to form two pairs of opposed triangular projections.

11. A package for a bicycle having a frame carrying a wheel with a pneumatic tire thereon, said package comprising a container adapted to receive the frame and wheel, a spacer comprising a central portion having a width approximating the width of the container and having opposed triangular shaped hollow projections extending from opposite sides of the central portion, said spacer adapted to be positioned in the container at one end of the bicycle with the apexes of one pair of projections engageable with the adjacent end wall of the container and with the adjacent diverging walls of the other pair of projections engageable with opposite sides of the pneumatic tire.

12. A package for a bicycle having a frame carrying a wheel with a pneumatic tire thereon, said package comprising a container adapted to receive the frame and wheel, a spacer comprising a sheet of bendable material folded to form a central portion having a width approximating the width of the container and to form laterally spaced vertically extending hollow projections at one side of the central portion, said spacer adapted to be inserted in the container beyond the wheel of the bicycle with the central portion extending transversely of the container and with the adjacent portion of the pneumatic tire extending between the hollow projections, the adjacent walls of the hollow projections extending in diverging planes from the central portion of the spacer and having a wedging engagement with opposite sides of the pneumatic tire.

LAWRENCE W. REAUME.